Figure 1:
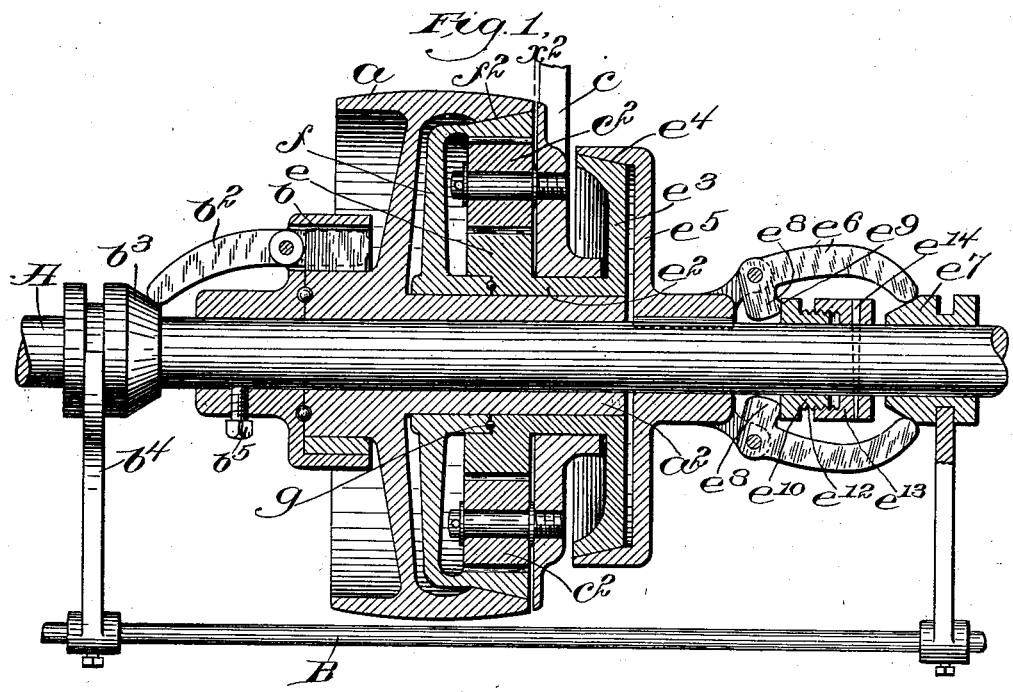

No. 701,634. Patented June 3, 1902.
C. F. SMITH.
REVERSING GEAR.
(Application filed July 19, 1901.)

(No Model.)

Witnesses: Jas. J. Maloney. Nancy P. Ford.

Inventor, Charles F. Smith, by J. P. and H. Livermore, Att'ys

UNITED STATES PATENT OFFICE.

CHARLES F. SMITH, OF BEACHMONT, MASSACHUSETTS, ASSIGNOR, BY DIRECT AND MESNE ASSIGNMENTS, TO SMITH SINGLE BELT REVERSING COUNTERSHAFT COMPANY, OF MELROSE, MASSACHUSETTS, A CORPORATION OF MAINE.

REVERSING-GEAR.

SPECIFICATION forming part of Letters Patent No. 701,634, dated June 3, 1902.

Application filed July 19, 1901. Serial No. 68,876. (No model.)

*To all whom it may concern:*

Be it known that I, CHARLES F. SMITH, of Beachmont, county of Essex, and State of Massachusetts, have invented an Improvement in Reversing-Gears, of which the following description, in connection with the accompanying drawings, is a specification, like letters on the drawings representing like parts.

The present invention relates to a reversing-gear for the counter-shafts of lathes, &c., or for any other driving mechanism, such as that utilized in automobiles, where the power-shaft continuously rotates in the same direction and it is desired at times to reverse the driven shaft or member by means of gearing.

The invention is embodied in a reversing-gear of that class in which internal and external gears are employed with intermediate gears which are held stationary while in operation, so that the rotation of the one gear in one direction will produce a rotation in the opposite direction of the other gear.

In accordance with the invention all of the gears which transmit the movement are so arranged as to be idle during the forward or normal rotation of the driven shaft, so that the said gears are only subjected to wear when in use for reversing the direction of the driven shaft, the power used to keep the said gears in operation thus being saved, as well as the wear and tear on the gears themselves. In accordance with the invention the driving-pulley is loosely mounted on the driven shaft (which will be hereinafter referred to as the "counter-shaft") which carries the load, and the said pulley when the counter-shaft is not in use is free to rotate on the said counter-shaft without producing any movement thereof. To drive the shaft in the normal direction or "forward" direction, as it may be referred to for convenience, the apparatus is provided with a clutch for connecting the said pulley directly with the shaft, and to drive the shaft in the opposite direction an internal gear normally disconnected from the pulley is employed, in connection with which there is a spur-gear normally disconnected from the shaft, there being also devices for connecting the said internal gear and the said spur-gear with the pulley and shaft, respectively. To transmit the motion from the internal gear to the spur-gear, there is also an intermediate member comprising a frame having a plurality of spur gear-wheels intermeshing, respectively, with said internal gear and said spur-gear, the said frame being provided with means for holding the same stationary at all times, so that when the internal gear is locked to the pulley the movement thereof will be transmitted from the pulley through the gear-wheels of the intermediate member to the spur-gear, causing a rotation of the counter-shaft in the reverse direction. While the pulley is locked directly to the counter-shaft to produce the forward movement thereof, the several gears above described are entirely disconnected from the pulley, so that they are not in action, the intermediate gear-frame being locked stationary, while the other members are free to rotate or not, according to the amount of friction developed in their bearings upon the pulley. When, therefore, the counter-shaft is being driven in its forward direction, there is no tendency for action through the gears, the result being that all the gears are idle when not in use, so that there is no waste power used in driving them and no wear on the said gears except when they are actually in useful operation. As herein shown, the same actuating device is employed for clamping the internal gear to the pulley and the external gear to the counter-shaft, so that only one actuating device need be employed in reversing the movement of said counter-shaft.

Figure 2:
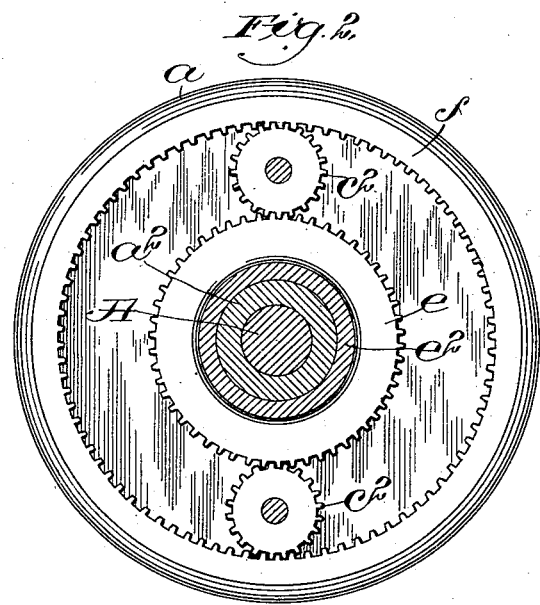

Figure 1 is a longitudinal section of a reversing mechanism embodying the invention. Fig. 2 is a transverse section of the same on the line $x^2$ of Fig. 1 looking toward the left.

The counter-shaft A has loosely mounted thereon a pulley $a$, which is provided with a hub $a^2$, adapted to be acted upon by a clutch member $b$ of any suitable construction and arrangement, shown as adapted to be thrown into operation by means of a lever $b^2$, acted upon by a cone $b^3$, sleeved on the shaft A and arranged to be moved longitudinally with relation thereto by means of a forked member $b^4$, connected with a shipper-rod B. By moving said shipper-rod B to the right, referring to the drawings, the pulley $a$ will be clutched to the member $b$, which is shown as connected with the counter-shaft A by the set-screws $b^5$, so that the said counter-shaft will be caused to rotate in the normal direction of movement of the pulley $a$.

For the purpose of reversing the direction of movement of the shaft A the apparatus is provided with a stationary member $c$, provided with a series of gear-wheels $c^2$, interposed between a pinion or spur gear member $e$ and an internal-gear member $f$, the said members each having a bearing upon the hub $a^2$ of the pulley $a$, the member $f$ being arranged to be clutched to the said pulley, so as to rotate therewith, while the member $e$ is arranged to be clutched to the shaft and driven by the pulley $a$ through the internal-gear member $f$ and the intermediate gears $c^2$. As herein shown, the spur-gear member $e$ is arranged to be connected with the shaft and the internal-gear member $f$ with the pulley $a$ by means of a single clutch-actuating mechanism common to both, the said parts normally being disconnected, respectively, from the shaft and the pulley, so that the pulley will normally rotate without having any action on the intermediate gears $c^2$. As herein shown, the spur-gear member $e$ is provided with a sleeve $e^2$, having a flange $e^3$, having a conical frictional engaging surface $e^4$, which is arranged to be engaged by a clutch member $e^5$, having a corresponding conical engaging surface, said member $e^5$ being splined upon the counter-shaft A and arranged to be longitudinally moved with relation thereto, as by levers $e^6$, pivotally connected to the member $e^5$, the said levers being acted upon by a sliding cone $e^7$, actuated by the shipper member B and arms $e^8$, which act against an adjustable shoulder $e^9$ on the shaft A. The internal-gear member $f$ is also provided with a conical friction-surface $f^2$, arranged to be in contact with a corresponding surface in the pulley $a$, said member $f$ being longitudinally movable along the hub $a^2$ of the pulley $a$, so as to be clutched thereto by the engagement of said conical surfaces. The member $e$ is so arranged as to bear against the member $f$ when acted upon by the clutching device $e^5$, so that when the said clutching device is forced into contact with the conical surface $e^4$ it will force the member $e$ against the member $f$, thus causing the member $f$ to slide along the hub $a^2$ until it is frictionally engaged by the pulley $a$, so as to rotate therewith. The hubs of the member $e$ and the member $f$ are shown as separated by antifriction-balls $g$ to take up the friction between them, since the said parts when clutched, respectively, to the pulley $a$ and the shaft A rotate in opposite directions through the action of the intermediate gears $c^2$.

In the operation of the device, assuming the shipper member B to be moved to the right, the pulley $a$ will be clutched directly to the shaft A and will cause the said shaft A to rotate in the direction of rotation of the pulley. When, however, the direction of rotation of the shaft A is to be reversed, the shipper member B is moved to the left, thus disconnecting the pulley $a$ from the said shaft and forcing the member $e^5$, which rotates with the shaft, into connection with the gear member $e$ through the flange $e^3$, the said gear member $e$ and the shaft A thus being connected together for rotation. The same movement forces the member $f$, which carries the internal gear, into connection with the pulley $a$, so that the said internal gear is caused to rotate with the pulley, the movement thereof being transmitted, through the intermediate gears $c^2$, which are mounted on the stationary frame $c$, to the gear member $e$, causing the rotation of the shaft A in the opposite direction. With the shipper-rod B in an intermediate position the pulley $a$ merely rotates idly without causing any rotation of the parts which are adapted to be connected therewith, and when said pulley is clutched to the shaft the said shaft is rotated without any corresponding rotation of the intermediate gears which are utilized to change the direction of rotation of the shaft.

In connection with this device I have shown means for adjusting the abutment or shoulder which is utilized in conjunction with the clutch-arms $e^6$, it being necessary to adjust a clutch of this class from time to time in order to compensate for wear, &c. As herein shown, the shoulder $e^9$ is sleeved on the shaft A and provided with a shank $e^{10}$, having an external screw-thread $e^{12}$, arranged to coöperate with a corresponding internal screw-thread in a cup or thimble $e^{13}$, which is secured upon the shaft, as by a pin $e^{14}$, driven through the shaft. The position of the shoulder $e^9$ with relation to the cone $e^7$ may therefore be varied by turning the member $e^9$ around the shaft, the means for adjustment being afforded without cutting a screw-thread on the shaft itself, which tends to weaken the said shaft.

I claim—

1. The combination with a shaft; of a pulley free to rotate on said shaft; means for clutching said pulley to said shaft; a fixed member; intermediate gears mounted thereon; external and internal gear members intermeshing with said intermediate gears; and means for connecting said external and internal gears respectively with said pulley and said shaft, as set forth.

2. The combination with the pulley loosely mounted on a shaft; of said shaft; means for connecting said pulley with and disconnecting it from said shaft; an internal gear arranged to be connected with said pulley; a pinion arranged to be connected with said shaft; a frame; one or more gears mounted on said frame and interposed between said internal gear and said pinion; and common actuating means for connecting said external gear with said pulley and said pinion with said shaft, as set forth.

3. The combination with a shaft; of a driven pulley; a fixed frame; intermediate gears mounted thereon; other gears adapted to coact through said intermediate gears; and means for connecting said other gears respectively with the pulley and the shaft.

4. The combination with a shaft; of a driven pulley; a fixed frame; intermediate gears mounted thereon; other gears adapted to coact through said intermediate gears; a clutch member for connecting one gear to the pulley; a second clutch member for connecting the other gear to the shaft; antifriction devices interposed between said clutch members; and an actuating device connected with one clutch member, as set forth.

In testimony whereof I have signed my name to this specification in the presence of two subscribing witnesses.

CHARLES F. SMITH.

Witnesses:
NANCY P. FORD,
JAS. J. MALONEY.